US008761925B2

(12) United States Patent
Yoon et al.

(10) Patent No.: US 8,761,925 B2
(45) Date of Patent: Jun. 24, 2014

(54) ROBOT AND METHOD OF BUILDING MAP THEREFOR

(75) Inventors: Sukjune Yoon, Seoul (KR); Woong Kwon, Seongnam-si (KR); Seung Yong Hyung, Yongin-si (KR); Hyun Kyu Kim, Seoul (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1102 days.

(21) Appl. No.: 12/289,274

(22) Filed: Oct. 23, 2008

(65) Prior Publication Data
US 2009/0276092 A1 Nov. 5, 2009

(30) Foreign Application Priority Data

Apr. 30, 2008 (KR) .................. 10-2008-0040616

(51) Int. Cl.
*G06F 19/00* (2011.01)
(52) U.S. Cl.
USPC ............ 700/245; 700/250; 700/255; 700/259
(58) Field of Classification Search
None
See application file for complete search history.

(56) References Cited

U.S. PATENT DOCUMENTS

| 5,109,425 | A  | * | 4/1992  | Lawton ............................ 382/107 |
| 5,144,685 | A  | * | 9/1992  | Nasar et al. ..................... 382/153 |
| 5,378,969 | A  | * | 1/1995  | Haikawa .................... 318/568.12 |
| 5,649,032 | A  | * | 7/1997  | Burt et al. ........................ 382/284 |
| 6,476,803 | B1 | * | 11/2002 | Zhang et al. ..................... 345/419 |
| 6,836,701 | B2 | * | 12/2004 | McKee ............................ 700/245 |
| 7,015,831 | B2 | * | 3/2006  | Karlsson et al. ............. 340/995.1 |
| 7,054,716 | B2 | * | 5/2006  | McKee et al. .................. 700/245 |
| 7,162,056 | B2 | * | 1/2007  | Burl et al. ....................... 382/104 |
| 7,162,338 | B2 | * | 1/2007  | Goncalves et al. .............. 701/23 |
| 7,211,980 | B1 | * | 5/2007  | Bruemmer et al. ............ 318/587 |
| 2003/0212472 | A1 | * | 11/2003 | McKee ............................ 700/245 |
| 2004/0076324 | A1 | * | 4/2004  | Burl et al. ........................ 382/153 |
| 2005/0126833 | A1 | * | 6/2005  | Takenaka et al. ................ 180/8.1 |
| 2007/0061043 | A1 | * | 3/2007  | Ermakov et al. ............... 700/263 |
| 2009/0276092 | A1 | * | 11/2009 | Yoon et al. ...................... 700/245 |

FOREIGN PATENT DOCUMENTS

| JP | 10-160463   | 6/1998  |
| JP | 2005-337863 | 12/2005 |

OTHER PUBLICATIONS

Wanner et al., Real time map refinement by fusing sonar and active stero vision, May 21-27, 1995, IEEE, vol. 3, pp. 2968-2973.*
Korean Office Action for corresponding Korean Application 10-2008-0040616; issued Nov. 16, 2009.

* cited by examiner

*Primary Examiner* — Bhavesh V Amin
(74) *Attorney, Agent, or Firm* — Staas & Halsey LLP

(57) ABSTRACT

Disclosed are a robot, which builds a map using a surface data of a three-dimensional image, from which a dynamic obstacle is removed, and a method of building a map for the robot. The method includes sequentially acquiring first and second surface data of a route on which the robot moves; matching the first and second surface data with each other to calculate a difference between the first and second surface data; detecting a dynamic obstacle from the first and second surface data according to the difference between the first and second surface data; generating a third surface data by removing the dynamic obstacle from at least one of the first and second surface data; and matching the third surface data and any one of the first and second surface data with each other to build the map.

18 Claims, 11 Drawing Sheets

ROBOT AND METHOD OF BUILDING MAP THEREFOR

CROSS-REFERENCE TO RELATED APPLICATIONS

This application claims the benefit of Korean Patent Application No. 2008-0040616, filed Apr. 30, 2008, in the Korean Intellectual Property Office, the disclosure of which is incorporated herein by reference.

BACKGROUND

1. Field

The present invention relates to a robot and a method of building a map therefor, and more particularly to a robot, which builds a map using surface data of a three-dimensional image, from which a dynamic obstacle is removed, and a method of building a map therefor.

2. Description of the Related Art

In general, machines, which conduct motion similar to that of a human using an electric or magnetic action, are referred to as robots. Recently, robots have been applied to various fields due to development of sensors and controllers. For example, there are housekeeping robots in homes, service robots in public facilities, transfer robots in industrial sites, and worker supporting robots. In order to allow a robot to conduct autonomous motion, localization in that a self position is recognized without previous data regarding the surrounding environment and map-building in which a map is built from the data regarding the environment must be carried out simultaneously. It is referred to as simultaneous localization and map-building (SLAM) of a robot.

Japanese Patent Laid-Open Publication No. H10-160463 discloses one example of a SLAM method.

In the SLAM method disclosed in the above document, an omnidirectional visual sensor having view fields in all directions is loaded beforehand to a moving body (robot), and obtains an image, which is set as a time series standard pattern, around the moving body when the moving body moves on a specific route. When the moving body moves on an optional route, the image obtained by the omnidirectional visual sensor is compared with an image set as the predetermined standard pattern. At this time, if the two images coincide with each other, the image of the moving body is judged to be at a position related to the image of the standard pattern, and a map around the surrounding environment is built. Here, it needs to be determined that an obstacle located on the route of the moving body is a fixed object (static object) or a moving object (dynamic object). The reason is that map data must be prepared based on only static objects, from which dynamic objects (hereinafter, referred to as dynamic obstacles) are removed.

However, the conventional SLAM method cannot recognize a correct position of a moving body but presumes only an approximate position of the moving body, and thus has a limit of recognizing whether or not an obstacle located on a route of the moving body is a static object or a dynamic obstacle. For example, when the dynamic obstacle is recognized as a static object, map data prepared based on the static object are distorted, and thus the position of the moving body obtained based on the map data includes many errors. Further, when the dynamic obstacle is recognized as a static object, the moving body cannot avoid the dynamic obstacle and thus may cause a collision with the dynamic obstacle.

SUMMARY

Therefore, one aspect of the embodiment is to provide a robot, which builds a correct map by removing a dynamic obstacle using a three-dimensional surface matching method in which a dynamic obstacle is detected from three-dimensional data of two surfaces, and a method of building a map for the robot.

Another aspect of the embodiment is to provide a robot, which converts three-dimensional distance data of a static object or a dynamic obstacle into a two-dimensional grid image and then removes the dynamic obstacle through contraction/expansion of the grid image, and a method of building a map for the robot.

Additional aspects and/or advantages will be set forth in part in the description which follows and, in part, will be apparent from the description, or may be learned by practice of the invention.

The foregoing and/or other aspects are achieved by providing a method of building a map for a robot, including: sequentially acquiring first and second surface data of a route on which the robot moves; matching the first and second surface data with each other to calculate a difference between the first and second surface data; detecting a dynamic obstacle from the first and second surface data according to the difference between the first and second surface data; generating third surface data by removing the dynamic obstacle from at least one of the first and second surface data; and matching the third surface data and any one of the first and second surface data with each other to build the map.

The first and second surface data may be surface data of three-dimensional images acquired by the robot during moving.

In the matching of the first and second surface data with each other, iterative closest point (ICP)-matching for registration of the first and second surface data may be first carried out.

The method may further include acquiring motion data of the robot; and calculating rigid body transformation matrixes of the first and second surface data from the motion data, and the ICP-matching for registration of the first and second surface data may be carried out on condition that the rigid body transformation matrixes are set as initial positions.

The difference between the first and second surface data may be a distance difference of the first and second surface data, ICP-matched with each other.

The detecting of the dynamic obstacle may include determining whether or not the distance difference of the first and second surface data is more than or equal to a designated distance; and detecting the dynamic obstacle from the first and second surface data when the distance difference of the first and second surface data is more than or equal to the designated distance.

The removing of the dynamic obstacle may include converting the first and second surface data, from which the dynamic obstacle is detected, into a two-dimensional grid image; and removing the dynamic obstacle from the first and second surface data by contracting/expanding the two-dimensional grid image.

In the generating of the third surface data, a surface data of a three-dimensional image may be generated by removing the dynamic obstacle from the first and second surface data.

In the matching of the third surface data and any one of the first and second surface data with each other, ICP-matching for registration of the third surface data and any one of the first and second surface data without the dynamic obstacle of the first and second surface data may be secondarily carried out.

Initial positions for the second ICP-matching may be the positions for the first ICP-matching.

The foregoing and/or other aspects are achieved by providing a robot, including: a surface data acquiring unit to sequentially acquire first and second surface data of a route, on which the robot moves; and a control unit to match the first and second surface data with each other to detect a dynamic obstacle from the first and second surface data, generate a third surface data by removing the dynamic obstacle from at least one of the first and second surface data, and match the third surface data and any one of the first and second surface data with each other.

The surface data acquiring unit may be a three-dimensional measuring apparatus to measure the first and second surface data acquired while the robot moves.

The control unit may match the third surface data and any one of the first and second surface data with each other to build a map on which the robot moves.

The robot may further include a storing unit to store the first to third surface data, and the storing unit may store a plurality of surface data of three-dimensional images sequentially acquired while the robot moves.

The control unit may first perform ICP-matching for registration of the first and second surface data, and detect the dynamic obstacle from the first and second surface data when a distance difference of the first and second surface data is more than or equal to a designated distance.

The control unit may convert the first and second surface data, from which the dynamic obstacle is detected, into a two-dimensional grid image, and remove the dynamic obstacle by contracting/expanding the two-dimensional grid image.

The control unit may generate the third surface data of a three-dimensional image by removing the dynamic obstacle from the first and second surface data.

The control unit may secondarily perform ICP-matching for registration of the third surface data and any one data without the dynamic obstacle of the first and second surface data.

The foregoing and/or other aspects are achieved by providing a method of building a map for a robot, including: sequentially acquiring first and second surface data of objects located on a moving route of the robot; matching the first and second surface data with each other; calculating a distance difference between the first and second surface data to determine whether a section exists in which the distance difference between the first and second surface data is greater than or equal to a predetermined value, the section being recognized as a dynamic obstacle; generating third surface data by removing the dynamic obstacle from at least one of the surface data; and matching the third surface data with one of the first and second surface data to build the map.

The method may further include converting the section in which the distance difference is greater than or equal to the predetermined value into a two-dimensional grid image; and removing an error by contracting/expanding the two-dimensional grid image to generate the third surface data.

BRIEF DESCRIPTION OF THE DRAWINGS

These and/or other aspects and advantages will become apparent and more readily appreciated from the following description of the embodiment, taken in conjunction with the accompanying drawings in which.

DETAILED DESCRIPTION OF EMBODIMENT

Figure 1:
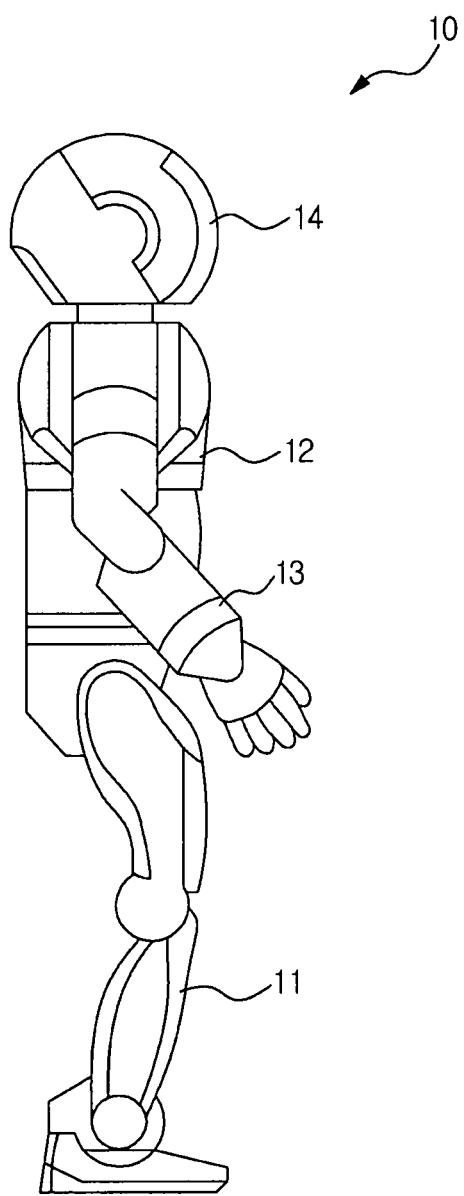
FIG. 1 is a schematic view illustrating an external appearance of a robot in accordance with an embodiment.

Reference will now be made in detail to the embodiment, an example of which is illustrated in the accompanying drawings, wherein like reference numerals refer to like elements throughout. The embodiment is described below to explain the present invention by referring to the annexed drawings.

FIG. 1 is a schematic view illustrating an external appearance of a robot in accordance with an embodiment.

In FIG. 1, a robot 10 of the present invention is a biped walking robot, which walks erect using two legs 11 like a human, and has an upper body 12, two arms 13, and a head 14 as well as the two legs 11.

Figure 2:
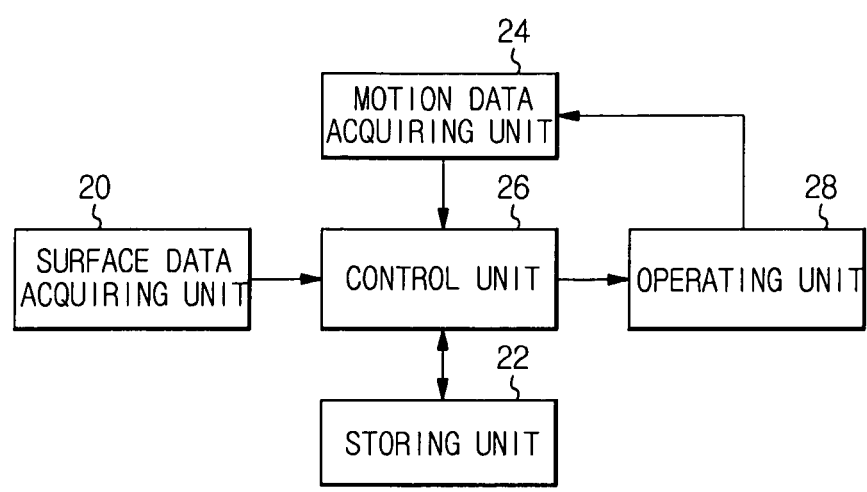
FIG. 2 is a control block diagram of the robot in accordance with the embodiment.

FIG. 2 is a control block diagram of the robot in accordance with the embodiment of the present invention.

In FIG. 2, the robot 10 of the present invention includes a surface data acquiring unit 20, a storing unit 22, a motion data acquiring unit 24, a control unit 26, and an operating unit 28.

The surface data acquiring unit 20 is a three-dimensional measuring apparatus (for example, a stereo camera or a time-of-flight camera), which sequentially acquires first and second surface data S1 and S2 of three-dimensional images obtained at an interval of a designated time (within approximately 1 second) while the robot 10 moves in an environment with an obstacle. Recently, due to the technical development of the three-dimensional measuring apparatus, the robot 10 can easily acquire three-dimensional data (surface data) S1 and S2 of various objects (for example, a dynamic obstacle or a static object) located on the moving route of the robot 10.

The storing unit 22 is a memory, which stores the first and second surface data S1 and S2 of the three-dimensional images sequentially acquired through the surface data acquiring unit 20. Since the surface data acquiring unit 20 acquires the first and second surface data S1 and S2 of the three-dimensional images at an interval of a designated time (within approximately 1 second), the storing unit 22 must store the acquired first surface data S1 before the second surface data S2 is acquired. Thus, the storing unit 22 stores a plurality of three-dimensional surface data including the first and second surface data S1 and S2 of the continuous three-dimensional images.

The motion data acquiring unit 24 acquires motion data of the robot 10 moving along the moving route using odometry while the surface data acquiring unit 20 acquires the first and second surface data S1 and S2 of the three-dimensional images at an interval of a designated time (within approximately 1 second). The motion data acquiring unit 24 acquires motion data of the moving robot 10 until the surface data acquiring unit 20 acquires the first and second surface data S1 and S2.

The control unit 26 calculates rigid body transformation matrixes (Rotation Matrix: R and Translation Matrix: T) of the first and second surface data S1 and S2 of the three-dimensional images acquired by the surface data acquiring unit 20 using the motion data acquired by the motion data acquiring unit 24. Since the calculated rigid body transformation matrixes of the first and second surface data S1 and S2 include many errors (i.e., slips), the control unit 26 first performs an iterative closest point (ICP) algorithm on condition that the R and T matrixes are set as initial positions, and thus the first and second surface data S1 and S2 are matched with each other. The control unit 26 detects a dynamic obstacle by calculating a distance difference between the first and second surface data S1 and S2, first ICP-matched to each other, and then generates third surface data S2' of the three-dimensional image, from which the dynamic obstacle is removed. Thereafter, the control unit 26 secondly performs the ICP algorithm using the third surface data S2' of the three-dimensional image, from which the dynamic obstacle is removed, and the three-dimensional data S1 or S2 without the dynamic obstacle out of the first and second surface data S1 and S2. That is, the control unit 26 is a central processing unit (CPU) of the robot, which calculates final transformation matrixes using a three-dimensional surface matching method, and prepares map data based on only static objects.

Further, the control unit 26 removes a dynamic obstacle by a method of removing an error by detecting a section in which a distance difference between the first and second surface data S1 and S2, first ICP-matched to each other, is more than a predetermined value, detecting the dynamic obstacle when the distance difference between the first and second surface data S1 and S2 is more than the predetermined value, converting the section in which the distance difference between the first and second surface data S1 and S2 is more than the predetermined value, into a two-dimensional grid image, and contracting/expanding the grid image.

The operating unit 28 operates the robot 10 based on the map data prepared by the control unit 26 such that the robot 10 can autonomously move along the moving route without a collision with an obstacle.

Hereinafter, the moving process and function of the above robot and the method of building a map therefor will be described.

In the present embodiment, the ICP algorithm used to match three-dimensional surface data with each other is a general method for registration of two surfaces. That is, the relation between rotation and translation of a rigid body motion to minimize the sum total of the distances between points on the two surfaces is found out. The ICP algorithm is implemented by various methods.

A method of implementing the ICP algorithm proposed by Horn is that the registration between two different coordinate systems is achieved using unit quaternions based on a covariance matrix [B. K. P. Horn, "Closed-Form Solution of Absolute Orientation Using Unit Quaternions," Journal of the Optical Society of America, A, Vol. 4. pp. 629-642, April 1987]. On the other hand, a method of implementing the ICP algorithm proposed by Besl and Mckay is most widely used now to achieve the registration, and in this method, the registration is optimized by repeatedly finding out a pair of points of two data groups, which are the closest to each other, without a process of picking out coincident points [P. J. Besl and N. D. Mckay, "A Method for Registration of 3-D shapes," IEEE Transactions on Pattern Analysis and Machine Intelligence, Vol. 14, No. 2, pp. 239-256, February 1992].

When the matching of the first and second surface data S1 and S2 of the three-dimensional images is performed by the ICP algorithm, a dynamic obstacle causes an error. Thus, in the present embodiment, correct map data are prepared using only static objects based on a three-dimensional surface matching method of removing the error caused by the dynamic obstacle.

Figure 3:
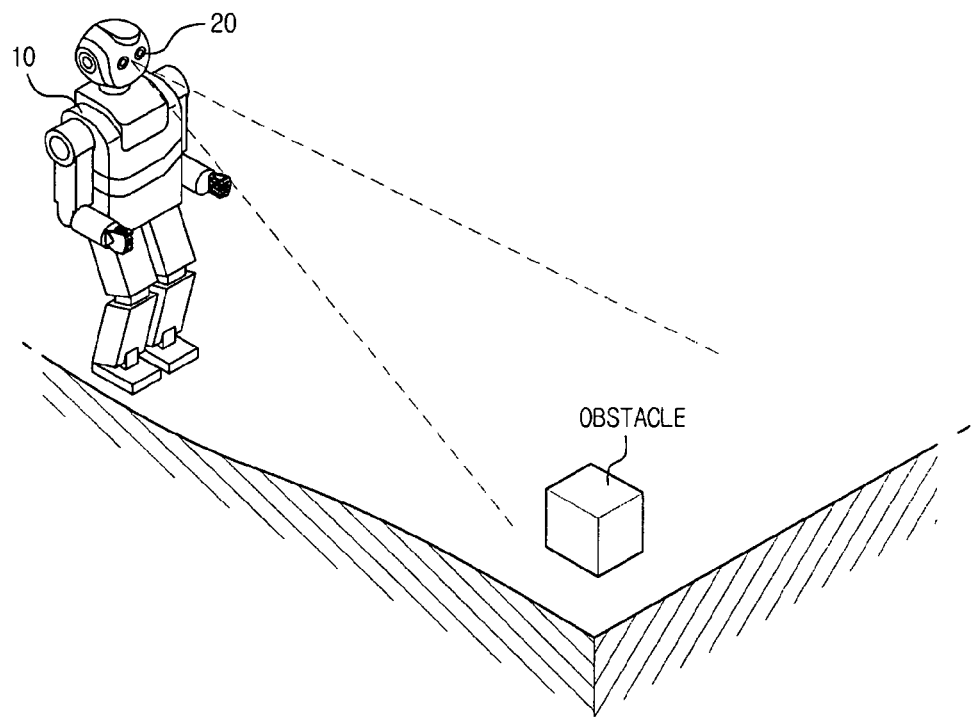
FIG. 3 is a schematic view illustrating one example of a location of an obstacle on a moving route of the robot in accordance with the embodiment.
Figure 4A:
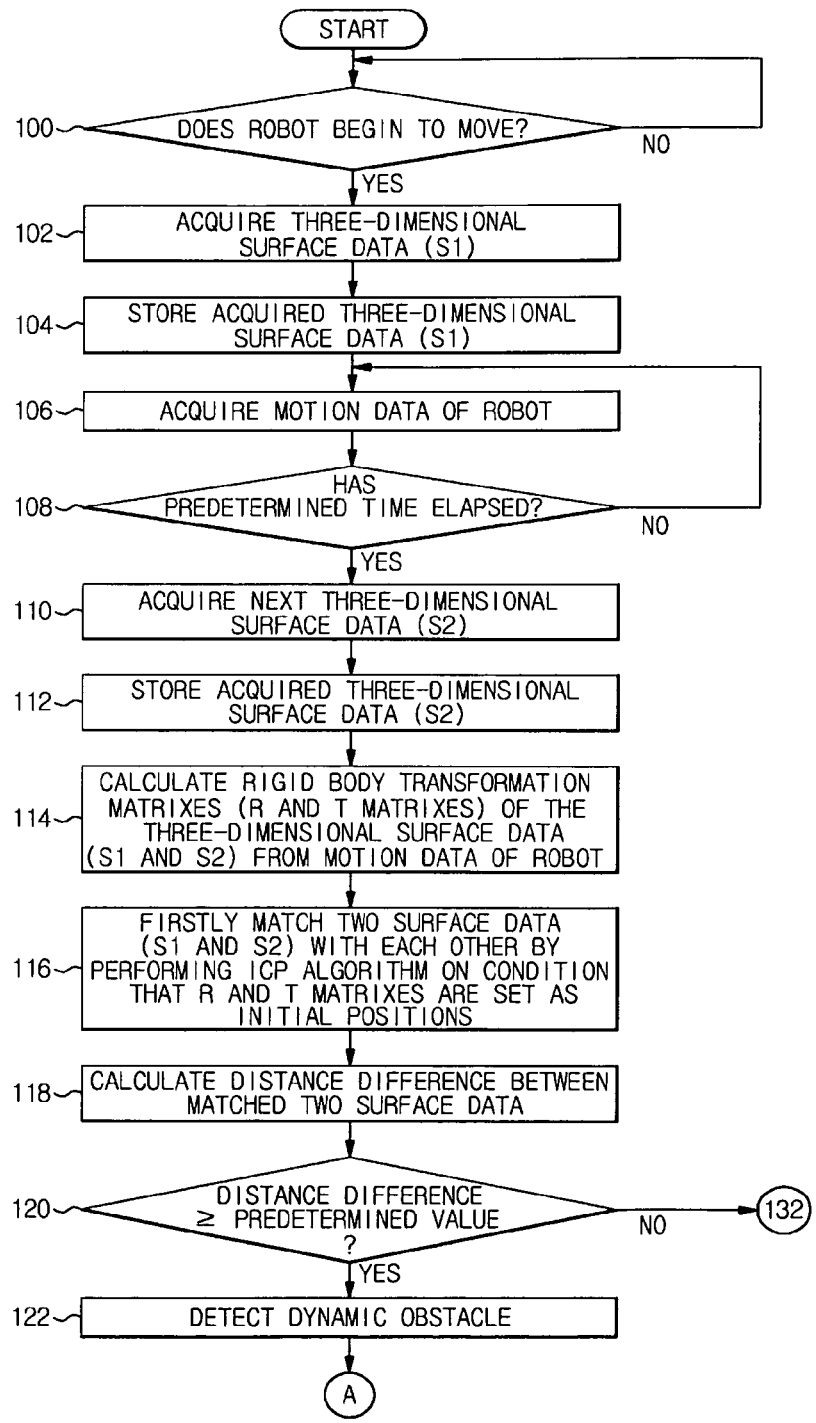
FIGS. 4A and 4B are flow charts illustrating a method of building a map for a robot in accordance with an embodiment.
Figure 4B:
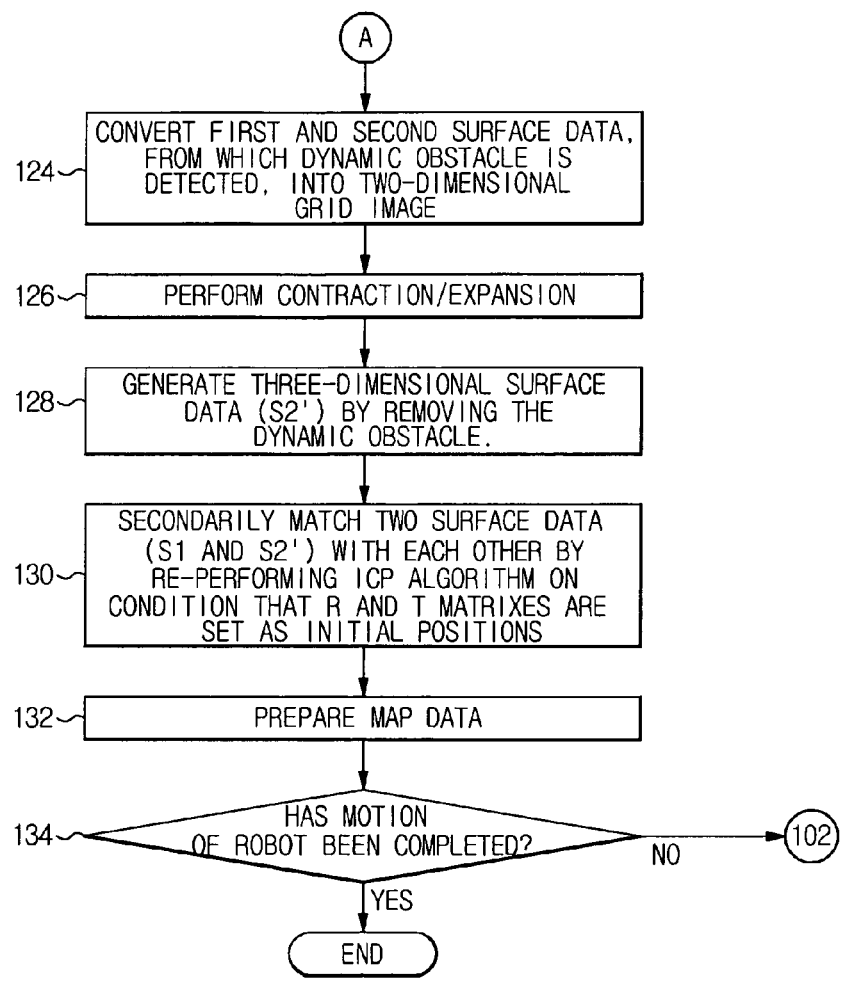

FIG. 3 is a schematic view illustrating one example of a location of an obstacle on a moving route of the robot in accordance with an embodiment, and FIGS. 4A and 4B are flow charts illustrating a method of building a map for a robot in accordance with an embodiment.

As shown in FIG. 3, when the robot 10 begins to move under an environment with an obstacle (operation 100), the control unit 26 acquires first surface data S1 of a three-dimensional image of various objects (for example, a dynamic obstacle or a static object) located on the moving route of the robot 10 through the surface data acquiring unit 20 (operation 102), and stores the acquired first surface data S1 in the storing unit 22 (operation 104).

Thereafter, the control unit 26 acquires motion data of the robot 10 moving along the moving route through the motion data acquiring unit 24 until the control unit 26 acquires second surface data S2 of a next three-dimensional image (operation 106), and determines whether or not a predetermined time (within approximately 1 second) has elapsed (operation 108).

As a result of the determination of operation 108, when the predetermined time has not elapsed, the method is fed back to operation 106 such that the control unit 26 continuously acquires motion data of the robot 10 through the motion data acquiring unit 24 until the control unit 26 acquires second surface data S2 of a next three-dimensional image, and then subsequent operations are carried out.

On the other hand, as the result of the determination of operation 108, when the predetermined time has elapsed, the control unit 26 acquires second surface data S2 of a next three-dimensional image located on the moving route of the robot 10 through the surface data acquiring unit 20 (operation 110), and stores the acquired second surface data S2 in the storing unit 22 (operation 112).

When plural (for example, two) data, i.e., the first and second surface data S1 and S2, are stored in the storing unit 22, as described above, the control unit 26 calculates rigid body transformation matrixes (Rotation Matrix: R and Translation Matrix: T) of the first and second surface data S1 and S2 of the three-dimensional images using the motion data of the robot 10 acquired by the motion data acquiring unit 24 (operation 114). A process of calculating rigid body transformation matrixes (Rotation Matrix: R and Translation Matrix: T) of the first and second surface data S1 and S2 of the three-dimensional images using the motion data of the robot 10, i.e., of obtaining the relation between precise rigid body motions (rotation and translation) to minimize the sum total of the distances between points on the two surfaces in the ICP algorithm, is disclosed in various documents, including Korean Patent Laid-Open Publication Nos. 2003-0040701 and 2004-0094230.

Since the transformation matrixes of the first and second surface data S1 and S2 include many errors (slips, etc.), an ICP algorithm is performed on condition that the R and T matrixes are set as initial positions, and thus the first and second surface data S1 and S2 are first matched with each other (operation 116). The ICP algorithm is a general method for registration of two surfaces to minimize the sum total of distance differences between the two surfaces by repetition. The ICP algorithm implementing method is disclosed in various documents, including Korean Patent Laid-Open Publication Nos. 2003-0040701 and 2004-0094230, as described above.

Figure 5A:
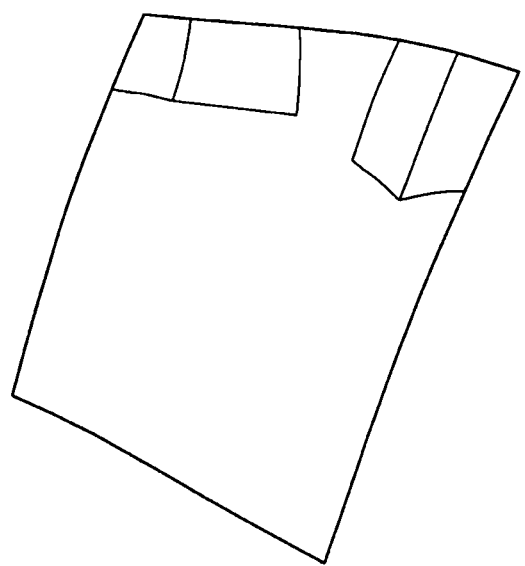
FIGS. 5A to 5C are views illustrating one example of an ICP algorithm of matching two surfaces with each other to build a map in a robot in accordance with the present embodiment.
Figure 5B:
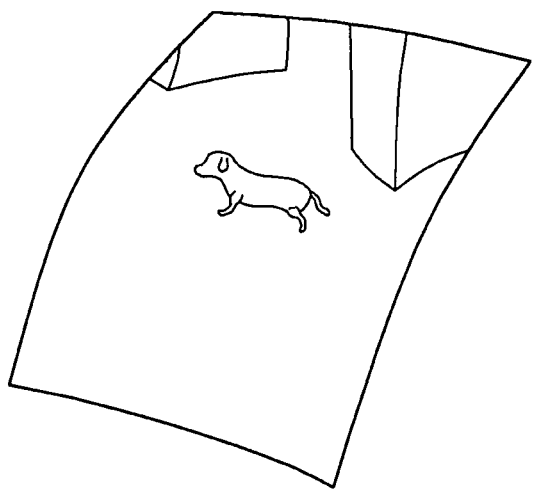
Figure 5C:
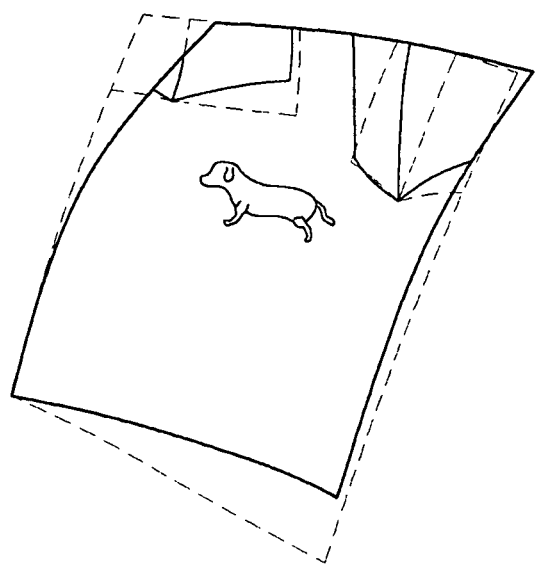
Figure 6:
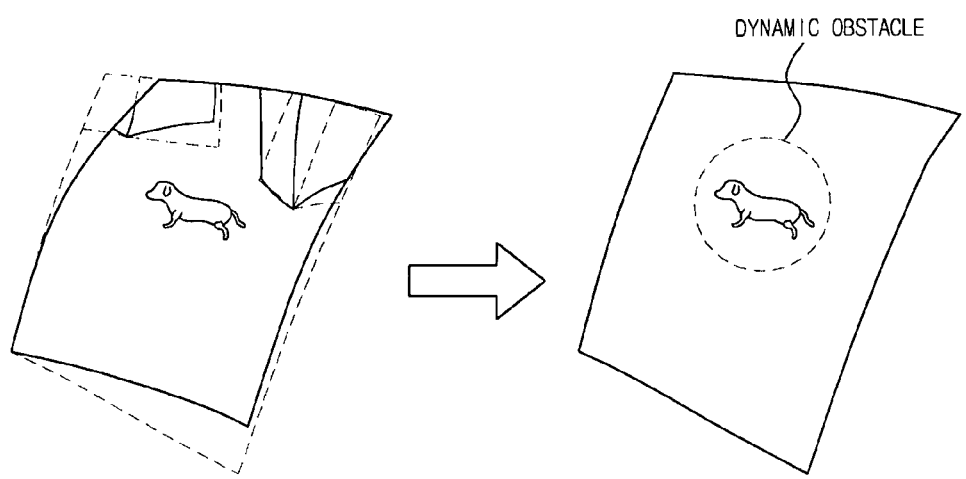
FIG. 6 is a view illustrating a process of detecting a dynamic obstacle through the ICP algorithm of FIGS. 5A to 5C.

The first and second surface data S1 and S2 of the three-dimensional images are matched with each other by the above ICP algorithm, as shown in FIGS. 5A to 5C. If the first surface data S1 of the former three-dimensional image is acquired within a time t (with reference to FIG. 5A), the second surface data S2 of the latter three-dimensional image is acquired within a time t+1, i.e., within approximately 1 second from the time t (with reference to FIG. 5B), and the sequentially acquired first and second surface data S1 and S2 of the three-dimensional images are ICP-matched with each other, as shown in FIG. 5C.

If a dynamic obstacle exists during a surface matching process using the ICP algorithm, an error may be caused and a map with distorted data may be built. Thus, the control unit 26 calculates a distance difference between the first and second surface data S1 and S2, first ICP-matched to each other (operation 118), and determines whether or not a section exists in which the distance difference between the first and second surface data S1 and S2 is more than or equal to a predetermined value (operation 120).

Figure 7:
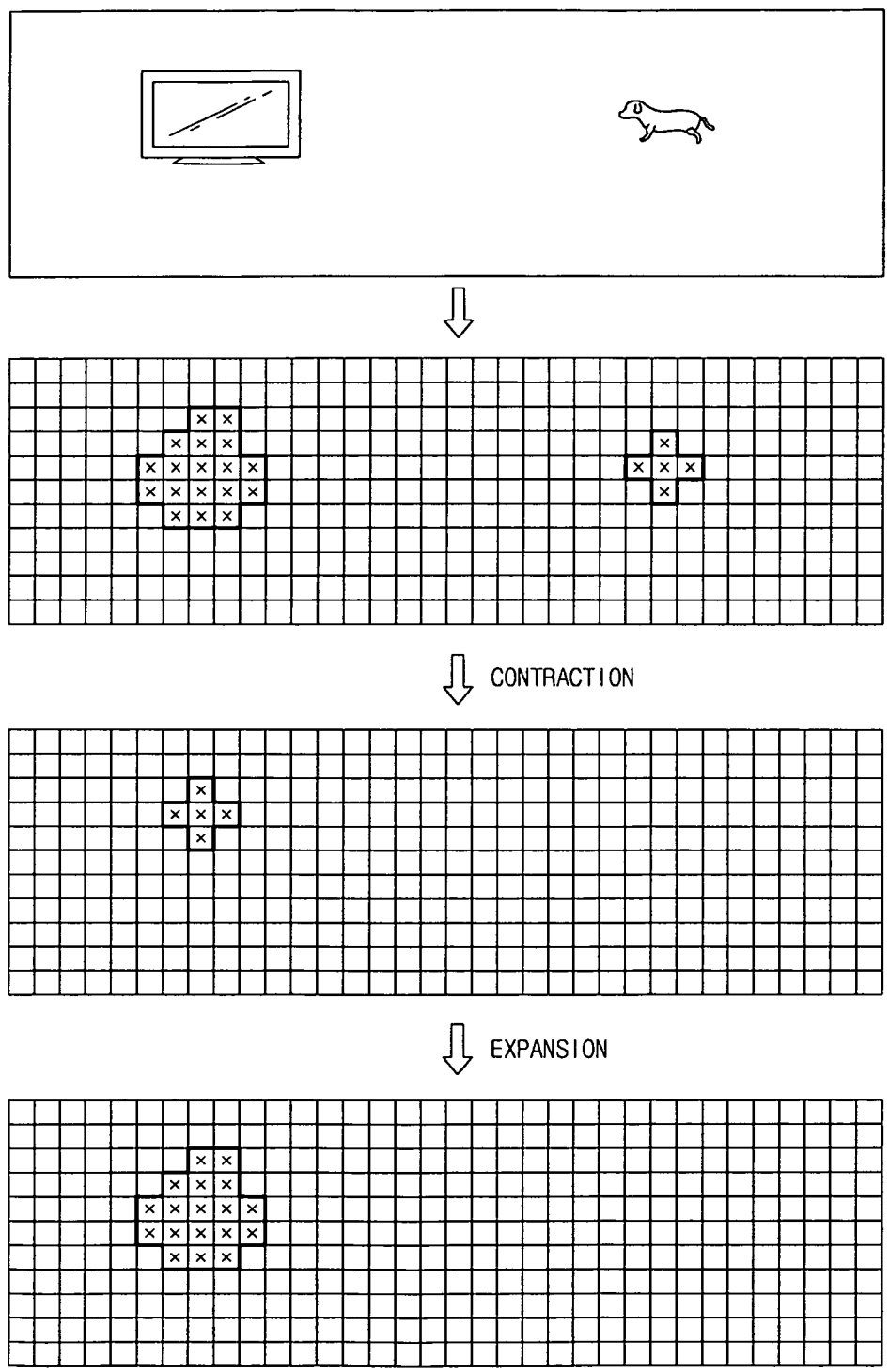
FIG. 7 is a view illustrating a process of removing the dynamic obstacle detected through the process of FIG. 6.

As a result of the determination of operation 120, when the section in which the distance difference between the first and second surface data S1 and S2 is more than or equal to the predetermined value is detected, the control unit 26 recognizes the section in which the distance difference between the first and second surface data S1 and S2 is more than or equal to the predetermined value as a dynamic obstacle (operation 122), and converts the section in which the distance difference between the first and second surface data S1 and S2 is more than or equal to the predetermined value, into a two-dimensional grid image, as shown in FIG. 7 (operation 124).

Then, the control unit 26 removes an error through contraction/expansion of the distance data converted into the two-dimensional grid image, as shown in FIG. 7, (operation 126), and thus generates third surface data S2' of the three-dimensional image, from which the dynamic obstacle is removed (operation 128).

Figure 8:
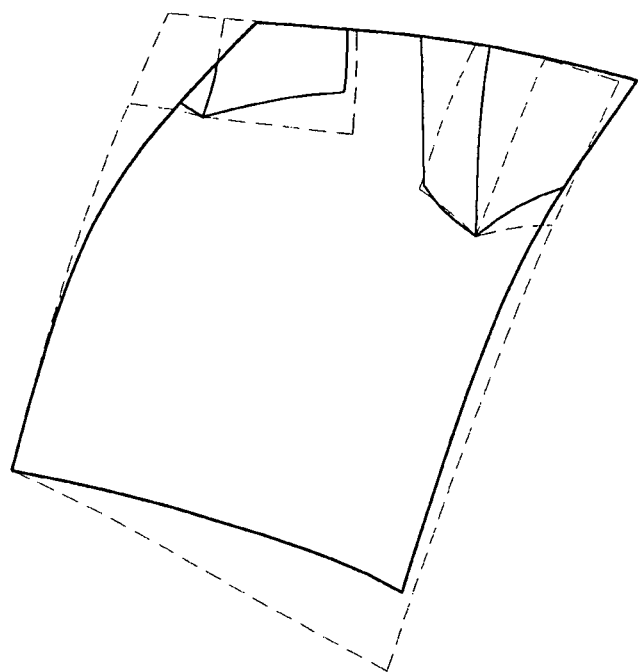
FIG. 8 is a view illustrating a result obtained by matching the two surfaces with each other, from which the dynamic obstacle is removed through the process of FIG. 7.

Thereafter, the control unit 26 secondly performs the ICP algorithm using the third surface data S2' of the three-dimensional image from which the dynamic obstacle is removed, and the three-dimensional data without the dynamic obstacle (for example, the first surface data S1) out of the first and second surface data S1 and S2 (operation 130). In the same manner as operation 116, the ICP algorithm is performed on the condition that the R and T matrixes are set as initial positions, and thus final transformation matrixes are calculated by a three-dimensional surface matching method of matching the first and third surface data S1 and S2' with each other, as shown in FIG. 8.

Thereafter, the control unit 26 prepares map data based on only static objects without dynamic obstacles and stores the map data in the storing unit 22 (operation 132), and determines whether or not the motion of the robot 10 has been completed (operation 134).

As a result of the determination of operation 134, when the motion of the robot 10 has not been completed, the method is fed back to operation 102 and thus subsequent operations, in which, while the robot 10 moves under an environment with an obstacle, the control unit 26 removes the dynamic obstacle by the three-dimensional surface matching method of acquiring surface data of a next three-dimensional image and implementing the ICP algorithm, and continuously prepares map data based on only static objects, are repeated.

On the other hand, as the result of the determination of operation 134, when the motion of the robot 10 has been completed, the control unit 26 completes the motion of the robot 10 through the operating unit 28 and then terminates the motion of the robot 10.

As apparent from the above description, the present embodiment provides a robot and a method of building a map therefor, in which correct map data are prepared based on only static objects by a three-dimensional surface matching method in which three-dimensional image data of continuous two surfaces are acquired, a dynamic obstacle is detected by obtaining a distance difference between the two surfaces by matching the three-dimensional image data of the two surfaces with each other through an ICP algorithm, and the ICP algorithm is secondarily implemented using surface data of the three-dimensional image from which the dynamic obstacle is removed.

Further, in the robot and the method of building a map therefor in accordance with the present embodiment, the three-dimensional distance data of a dynamic obstacle or a static object is converted into a two-dimensional grid image and the dynamic obstacle is removed by contraction/expansion of the grid image, and thus it is possible to remove the generation of errors causing a collision of the robot with the dynamic obstacle.

Although an embodiment has been shown and described, it would be appreciated by those skilled in the art that changes may be made in this embodiment without departing from the principles and spirit of the invention, the scope of which is defined in the claims and their equivalents.

What is claimed is:

1. A method of building a map for a robot comprising:
   sequentially acquiring first and second surface data of a route on which the robot moves;
   matching the first and second surface data with each other to calculate a difference between the first and second surface data;
   detecting a dynamic obstacle from the first and second surface data according to the difference between the first and second surface data;
   generating third surface data by removing the dynamic obstacle from at least one of the first and second surface data; and
   matching the third surface data and any one without the dynamic obstacle of the first and second surface data with each other to build the map,
   wherein the matching the first and second surface data with each other is first carried out by iterative closest point (ICP)-matching for registration of the first and second surface data.

2. The method according to claim 1, wherein the first and second surface data are surface data of three-dimensional images acquired by the robot during moving.

3. The method according to claim 1, further comprising:
   acquiring motion data of the robot; and
   calculating rigid body transformation matrixes of the first and second surface data from the motion data,
   wherein the ICP-matching for registration of the first and second surface data is carried out on condition that the rigid body transformation matrixes are set as initial positions.

4. The method according to claim 1, wherein the difference between the first and second surface data is a distance difference of the first and second surface data, ICP-matched with each other.

5. The method according to claim 4, wherein the detecting of the dynamic obstacle includes determining whether or not the distance difference of the first and second surface data is more than or equal to a designated distance, and detecting the dynamic obstacle from the first and second surface data when the distance difference of the first and second surface data is more than or equal to the designated distance.

6. The method according to claim 5, wherein the removing of the dynamic obstacle includes:
converting the first and second surface data, from which the dynamic obstacle is detected, into a two-dimensional grid image; and
removing the dynamic obstacle by contracting/expanding the two-dimensional grid image.

7. The method according to claim 1, wherein the generating the third surface data generates surface data of a three-dimensional image by removing the dynamic obstacle from the first and second surface data.

8. The method according to claim 7, wherein ICP-matching for registration of the third surface data and any one of the first and second surface data without the dynamic obstacle of the first and second surface data is secondarily carried out in the matching of the third surface data and any one of the first and second surface data with each other.

9. The method according to claim 8, wherein initial positions for the second ICP-matching are positions for the first ICP-matching.

10. A robot, comprising:
a surface data acquiring unit sequentially acquiring first and second surface data of a route on which the robot moves; and
a control unit matching the first and second surface data with each other to detect a dynamic obstacle from the first and second surface data, generating third surface data by removing the dynamic obstacle from at least one of the first and second surface data, and matching the third surface data and any one without the dynamic obstacle of the first and second surface data with each other,
wherein the control unit first performs iterative closest point (ICP)-matching for registration of the first and second surface data.

11. The robot according to claim 10, wherein the surface data acquiring unit is a three-dimensional measuring apparatus to measure the first and second surface data acquired while the robot moves.

12. The robot according to claim 10, wherein the control unit matches the third surface data and any one of the first and second surface data with each other to build a map used by the robot to move.

13. The robot according to claim 10, further comprising a storing unit storing the first, second and third surface data, the storing unit stores a plurality of surface data of three-dimensional images sequentially acquired while the robot moves.

14. The robot according to claim 10, wherein the control unit detects the dynamic obstacle from the first and second surface data when a distance difference of the first and second surface data, the ICP-matched with each other is more than a designated distance.

15. The robot according to claim 14, wherein the control unit converts the first and second surface data, from which the dynamic obstacle is detected, into a two-dimensional grid image, and removes the dynamic obstacle by contracting/expanding the two-dimensional grid image.

16. The robot according to claim 15, wherein the control unit generates the third surface data of a three-dimensional image by removing the dynamic obstacle from the first and second surface data.

17. The robot according to claim 16, wherein the control unit secondarily performs ICP-matching for registration of the third surface data and any one of the first and second surface data without the dynamic obstacle of the first and second surface data.

18. The robot according to claim 17, wherein initial positions for the second ICP-matching are positions for the first ICP-matching.

* * * * *

UNITED STATES PATENT AND TRADEMARK OFFICE
CERTIFICATE OF CORRECTION

PATENT NO. : 8,761,925 B2
APPLICATION NO. : 12/289274
DATED : June 24, 2014
INVENTOR(S) : Sukjune Yoon et al.

It is certified that error appears in the above-identified patent and that said Letters Patent is hereby corrected as shown below:

On the Title Page,

Column 2, Item [56] (Other Publications), Line 1, Delete "Wanner et al.," and insert -- Wallner et al., --, therefor.

Column 2, Item [56] (Other Publications), Line 2, Delete "stero" and insert -- stereo --, therefor.

Signed and Sealed this
Fourth Day of November, 2014

Michelle K. Lee
*Deputy Director of the United States Patent and Trademark Office*